(12) United States Patent
Rebernik (10) Patent No.: US 11,525,738 B2
(45) Date of Patent: Dec. 13, 2022

(54) DEVICE AND METHOD FOR DETERMINING THE THERMAL INSULATION QUALITY OF TWIN-WALLED, VACUUM-INSULATED CONTAINERS

(71) Applicant: CRYOSHELTER GMBH, Dobl-Zwaring (AT)

(72) Inventor: Matthias Rebernik, Dobl-Zwaring (AT)

(73) Assignee: CRYOSHELTER GMBH, Dobl-Zwaring (AT)

( * ) Notice: Subject to any disclaimer, the term of this patent is extended or adjusted under 35 U.S.C. 154(b) by 758 days.

(21) Appl. No.: 16/478,305

(22) PCT Filed: Jan. 5, 2018

(86) PCT No.: PCT/AT2018/060001
§ 371 (c)(1),
(2) Date: Jul. 16, 2019

(87) PCT Pub. No.: WO2018/129571
PCT Pub. Date: Jul. 19, 2018

(65) Prior Publication Data
US 2019/0368659 A1 Dec. 5, 2019

(30) Foreign Application Priority Data
Jan. 16, 2017 (AT) .............................. A 50028/2017

(51) Int. Cl.
*G01K 1/02* (2021.01)
*F17C 13/02* (2006.01)
*G01N 25/18* (2006.01)

(52) U.S. Cl.
CPC ............ *G01K 1/026* (2013.01); *F17C 13/026* (2013.01); *G01N 25/18* (2013.01); *F17C 2250/043* (2013.01); *G01K 2203/00* (2013.01)

(58) Field of Classification Search
CPC .. G01K 1/026; G01K 2203/00; F17C 13/026; F17C 2250/043; G01N 25/18
(Continued)

(56) References Cited

U.S. PATENT DOCUMENTS

| 6,487,866 B1 * | 12/2002 | Fesmire | G01N 25/18 62/51.1 |
| 6,824,306 B1 * | 11/2004 | Fesmire | G01N 25/18 374/34 |

FOREIGN PATENT DOCUMENTS

| DE | 102005014479 A1 * | 10/2006 | ....... B60K 15/03006 |
| DE | 102005014479 A1 | 10/2006 | |

(Continued)

OTHER PUBLICATIONS

International Search Report dated May 3, 2018, cited in PCT/AT2018/060001.

*Primary Examiner* — Nathaniel T Woodward
(74) *Attorney, Agent, or Firm* — Workman Nydegger (57) ABSTRACT

A dual-wall, vacuum-insulated container (30, 40) has an external wall (1), an internal wall (3) and there in-between a vacuum chamber (5), in which there is arranged a heat insulation device (2, 20). At least three temperature sensors (13, 13a, 13b, 14, 15) that are spaced apart from another recurringly register instantaneous temperatures ($T_1$, $T_2$, $T_{2A}$, $T_{2B}$, $T_3$) of the container (30, 40). At least in some points there is calculated a temperature course using a heat insulation model on the basis of the construction and material characteristics of the container and the heat radiation resulting therefrom, which temperature course contains at least two of the temperatures ($T_1$, $T_2$, $T_{2A}$, $T_{2B}$, $T_3$) registered. From the temperature course there is calculated a desired temperature value for the position of at least one further of the temperature sensors and compared with the actual temperature value actually registered by this temperature sensor.

(Continued)

From the deviation between the desired temperature value and the actual temperature value there is detected a change of the heat insulation quality of the container.

22 Claims, 4 Drawing Sheets

(58) Field of Classification Search
USPC .......................................................... 374/44
See application file for complete search history.

(56) References Cited

FOREIGN PATENT DOCUMENTS

| | | | | |
|---|---|---|---|---|
| EP | 3012510 A1 * | 4/2016 | ............. | B63B 25/14 |
| EP | 3012510 A1 | 4/2016 | | |
| JP | H04169777 A | 6/1992 | | |
| WO | WO-2016086504 A1 * | 6/2016 | ......... | F28D 15/0266 |
| WO | 2016/128696 A1 | 8/2016 | | |

* cited by examiner

DEVICE AND METHOD FOR DETERMINING THE THERMAL INSULATION QUALITY OF TWIN-WALLED, VACUUM-INSULATED CONTAINERS

The invention relates to a device and a method for determining the heat insulation quality of dual-wall, vacuum-insulated containers.

The insulation grade of dual-wall, vacuum-insulated containers is, on the one side, significantly dependent on the vacuum quality. Over time—over the course of months or years, the vacuum pressure will incrementally increase due to outgassing of the materials and surfaces involved and/or due to diffusion through the sealing walls. As a consequence of mechanical defects such as, e.g., hairline cracks or severe damage, the vacuum pressure may also increase rapidly. If the vacuum pressure exceeds a certain threshold value, then this will lead to an increased heat introduction via the vacuum insulation, hence, the insulation grade being affected. The insulation grade may be restored by way of pumping empty anew the vacuum space. Pumping empty, however, is rather cumbersome and time-consuming.

On the other side, the insulation grade is dependent on the undisturbed development of super-insulation. One example is an individual heat insulation panel, which primary task is to prevent heat radiation, which is also why the term "heat radiation panel" is used. In the following description there is used, instead of the terms "heat insulation panel" or "heat radiation panel", also sometimes the abbreviated term "panel"; all three terms, as used herein, have the same meaning. The heat radiation panel is attached between internal wall (internal tank) and external wall (external container) such that, apart from the panel attachment, there is not existent any direct contact between heat radiation panel and external container or between heat radiation panel and internal tank, respectively. Such a direct contact would affect the insulation grade—according to the contact surface—as a consequence of the then additional direct heat conduction between heat radiation panel and the respective wall. The same is valid for multi-layered insulation (multi-layer-insulation—MLI), which is composed of a number of aluminium films and fibre mats (or similar materials having low heat conductivity) interposed there between. The effective insulation grade is, among others, essentially dependent on the layer density, this is, at which force the individual layers are pressed against one another. This force will influence heat conduction between the layers and, hence, the total heat flow in the direction to the internal wall that is comparably cold in comparison to the external wall. If this force—even locally—is increased by a deformation of, e.g., the external container, also the introduction of heat will increase.

In the following the problem the invention is based upon is explained by example of cryocontainers. Cryocontainers are used for the storage and transport of deep-cold liquefied gases at temperatures of −120° C. and less. Cryocontainers are composed of an external container and an internal tank. The internal tank is attached within the external container via an internal tank suspension. Pipelines for filling and retrieving the liquefied gas lead from the internal tank through the vacuum insulation space to the external container. External container and internal tank do not contact each other. The spacing (vacuum chamber) between external container and internal tank is evacuated. In the vacuum chamber there is additionally installed a heat insulation comprising one or several heat radiation panels, which reduce the introduction of heat caused by heat radiation. The optimum insulation effect of the heat radiation panels will be achieved if the vacuum pressure is less than $10^{-4}$ mbar, as starting from this pressure on, heat transfer by the remaining free molecules (residual gas) is neglectably low. If the pressure exceeds this value, then the transfer of heat by the residual gas will increase, up to the development of free convection and the substantial introduction of heat involved therewith, which may increase the storage loss of cryocontainers up to the uselessness thereof.

In order to measure vacuum pressures in the range of orders about $10^{-4}$ mbar, there will be required sensitive and expensive sensors and evaluation units such as, e.g., Pirani vacuum gauge, which may be used even for minimum pressures of $10^{-4}$, or ionization vacuum gauges, which are used for the pressure determination in the high and ultra-high vacuum region, this is from about $10^{-3}$ to $10^{-12}$. The principle of an ionization vacuum gauge is based on an indirect pressure measurement by means of electric values, which are proportional to the residual gas particles with the particle number density. For this purpose, the residual gas has to be ionized, for which there are existent various way of realization: cold cathode ionization vacuum gauge and hot cathode ionization vacuum gauge.

These measurement methods, however, are more expensive and not suitable in particular for the use in mobile applications such as, e.g., liquid gas tanks, in particular liquid natural gas fuel tanks (Liquid Natural Gas [LNG] fuel tanks).

The present invention utilizes the temperature course (several temperatures) at selected measurement points of the dual-wall container and/or within the dual-wall container (e.g., measurement points at heat insulation layers of a multi-layer insulation, at heat radiation panels, at the internal wall and/or the external wall) as a measure for detecting a change of the heat flows via the vacuum insulation of dual-wall, vacuum-insulated containers. The change of the heat flow (in general, an increase) may be the consequence of:

- an additional and/or increased physical contact (by increased contact compression) between one of the containers and a heat radiation panel or one or several layers of a multi-layer insulation, respectively;
- a change of the vacuum pressure; and/or
- a change of heat radiation characteristics of the acting surfaces, e.g. through wear (via service life).

In JP 2006-078190 A there is described a system, wherein there is arranged in a vacuum chamber formed between an external wall and an internal wall a temperature sensor, which does not contact any of the two walls. The temperature sensor may be wrapped in a multi-layered heat insulation film. This system is used such that initially the temperatures of the external wall and the internal wall are measured or assumed to be stationary at intact vacuum of the vacuum chamber, e.g., room temperature at the external wall and −196° C. (=boiling temperature of nitrogen) at the internal wall, forming a nitrogen container, and wherein the temperature in the vacuum chamber, which is determined as reference temperature, is being measured using the temperature sensor. In the continuous operation there are realized further temperature measurements using the temperature sensor, wherein the external and internal wall temperatures have to remain constant, wherein a vacuum loss (pressure increase) in the vacuum container is determined by comparing the reference temperature with the temperature currently measured by the temperature sensor. From the specification of this document there is drawn the conclusion that an increase of the temperature in the vacuum container is interpreted as a pressure increase. Optionally, there is provided in the known system in addition a device for detecting the occurrence of an abnormality of the heat load, wherein this detection device is not the temperature sensor. Instead, the detection device may be a device for holding the temperature constant, at which there is detected whether it suddenly has to use more energy than normal in order to keep the temperature of the internal space formed by the internal wall constant. As an alternative embodiment example of such a detection device, there is to be mentioned the registering of the amount of nitrogen evaporated from a nitrogen container arranged within the internal container with liquid nitrogen. An increase of the evaporated amount is interpreted as abnormality. Using this detection device, the arising of problems is to be monitored using a supra-conductor cable cooling system or a device arranged within the nitrogen container. Abnormalities with external cause, obviously, are not being taken into account. This monitoring system, hence, is only suitable for limited applications, wherein there may be assumed that the external temperature does not change and no disturbances with external cause will arise. The limited applications disclosed include a container with liquid nitrogen, in which there are housed laboratory devices, or supra-conductor cable cooling systems, which are stationarily provided in rooms. The known monitoring system, however, is not suitable for applications, wherein the external temperature may vary or, more in general, wherein the environmental parameters may be changing. Such environmental parameters that may be changing are in particular existent with vehicles, which are exposed to changing temperatures, weather conditions that may change and dynamic mechanical stress. In particular, the known system is completely unsuitable for monitoring liquid gas tanks with vehicles.

The present invention overcomes the limitations and disadvantages of prior art by providing a device and a method for determining the heat insulation quality of a dual-wall, vacuum-insulated container having the features of the claim 1 or the claim 13, respectively.

Further advantages and features of the invention become obvious from the sub claims and the subsequent description of exemplary embodiments.

The device according to the invention is intended to determine the heat insulation quality of a dual-wall, vacuum-insulated container, wherein the container has an external wall facing the surroundings as well as an internal wall defining an internal tank, wherein there is formed between the external wall and the internal wall of the dual-wall container a vacuum chamber, wherein there is arranged at least one heat insulation device. There are arranged at or within, respectively, the container at least three temperature sensor spaced apart from one another, which recurrently register instantaneous temperatures of the container, wherein the positions of the temperature sensors are selected from positions at the external wall, the internal wall and/or the heat insulation device. An evaluation unit equipped with a computer and a storage unit receives the temperatures registered by the temperature sensors. In the evaluation unit there is stored a preferably layered-wise heat transfer model on the basis of the construction and material characteristics of the container and the heat radiation resulting therefrom. The evaluation unit is configured to calculate from the heat transfer model at least in some points a temperature course, which contains at least two of the temperatures registered by the temperature sensors, and to calculate from the temperature course a desired temperature value for the position of at least one further temperature sensor and to compare it with the actual temperature value actually registered by this temperature sensor and to detect from the deviation between the desired temperature value and the actual temperature value a change of the heat insulation quality of the container if the deviation exceeds a limit value. The heat transfer model of the container preferably takes into account the heat conduction resulting from the construction and material characteristics of the container.

The heat transfer model may be calculated by way of the equations indicated in the subsequent description. The design of the container, i.e. the materials of the container, the characteristic thereof, the connection points and the geometry of the container have been known in advance, enabling pre-setting the heat transfer model, which is stored in the storage of the evaluation unit upon its implementation. Alternatively, but due to the high calculation efforts not preferably, the design data of the container might also be stored in the evaluation unit, and the evaluation unit itself could calculate the heat transfer model from this design data. The heat transfer model is preferably a layered model.

Heat radiation is proportional to the $4^{th}$ power of the temperature ($T^4$), whereas the solid body heat conduction and the residual gas heat conduction are essentially proportional to the first power of the temperature ($T^1$).

The temperature courses/the temperatures at different compositions of the proportions of the individual heat transfer types differ correspondingly markedly, and this effect is utilized for the inventive determination of the heat insulation quality of a dual-wall, vacuum-insulated container.

The invention is now explained in greater details only by way of exemplary embodiments in reference to the drawings.

Figure 1:
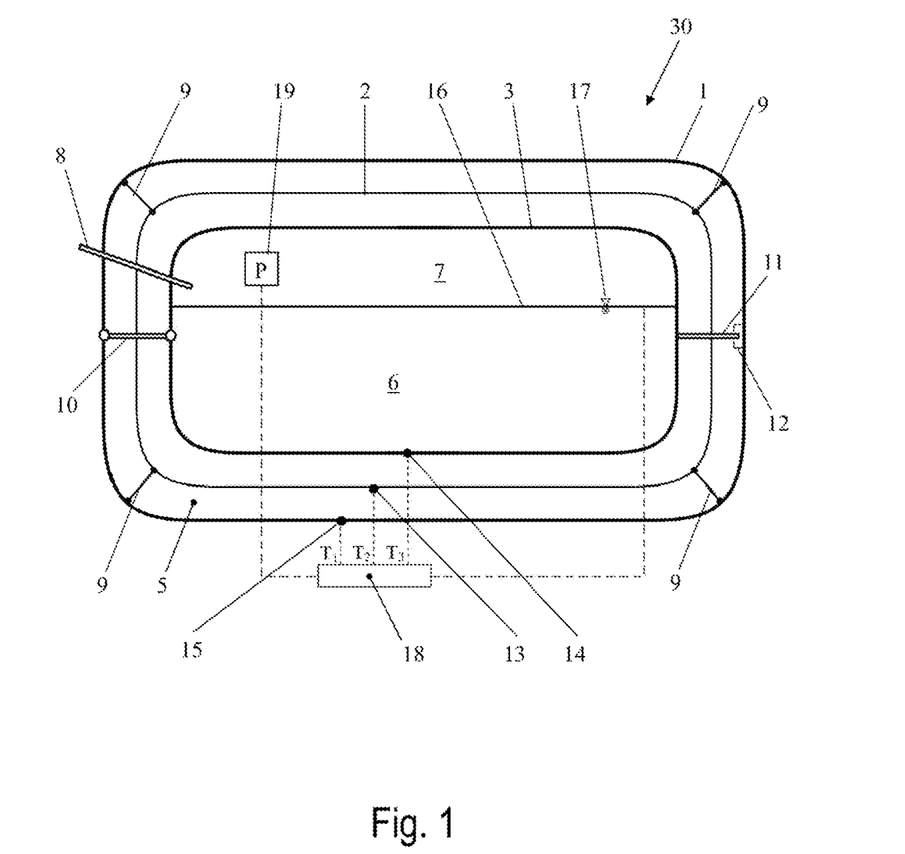
FIG. 1 schematically shows a cryocontainer having an inventive device for determining the heat insulation quality of this dual-wall, vacuum-insulated container in a longitudinal sectional view.

FIG. 1 schematically shows a cryocontainer 30 according to the invention in a longitudinal sectional view. The cryocontainer 30 is configured as a dual-wall container having an external wall 1 defining an external container and an internal tank, which is arranged within the external container, defined by an internal wall 3. The interspace between the external wall and the internal wall forms a vacuum chamber 5, which is evacuated before start of the operation of the cryocontainer 30. The internal tank is configured to receive liquefied gas 6 and for this purpose has a pipeline 8 passing from the internal space 7 of the internal tank through the vacuum chamber 5 and the external wall 1. The filling level 16 of the liquefied gas 6 may be measured using a filling level gauge 17, the signal of which is supplied to an evaluation unit 18 explained below in greater detail. The internal tank is attached within the external container by means of a suspension, which comprises a first rod 10, preferably made from a poorly heat conductive material, rigidly connecting the external wall 1 and the internal wall 3 and a second rod 11 arranged opposite to the first rod 10, which is fixedly mounted at the internal wall 3 and may be axially shifted in a gliding bearing 12, which is attached at the external wall 1. The external wall 1 and the internal wall 3 of the cryocontainer 30 do not have any direct contact with one another through this suspension. The internal wall 3 is surrounded by at least one heat insulation panel 2 arranged in the vacuum chamber 5, wherein the at least one heat insulation panel 2 is suspended at the external wall 1 by means of attachment rods 9 made from a poorly heat conductive material. As an alternative to the attachment rods 9, the at least one heat insulation panel 2 may also be adiabatically attached at the rods 10, 11. A temperature sensor 13 is attached at the heat insulation panel 2, which recurrently measures the temperature $T_2$ of the heat insulation panel 2. At least two further temperature sensors 15, 14 recurrently measure the temperature $T_1$ of the external wall 1 (by means of the temperature sensor 15) and/or the temperature $T_3$ at the internal wall 3 (by means of the temperature sensor 14) and/or the temperature at the at least one further heat insulation panel (not depicted in this figure). Alternative to one or several heat insulation panels 2, there may be provided a multi-layer simulation (MLI) (see FIG. 7), which comprises several composite layers made from a metal film, e.g., aluminium film, and a heat insulating material, e.g., fibre material or foam material. The composite layers be arranged, preferably concentrically, around the internal wall, or they may be configured as a coil having several convolutions. In such an embodiment, there is arranged a temperature sensor at least at one composite layer of the multi-layer insulation. The temperature signals of the temperature sensors 13, 14, 15 are supplied to an evaluation unit 18, which, if present, receives also the signals of the filling level gauge 17. Additionally or alternative to a temperature sensor 14 at the internal wall 3 there may also be provided a pressure sensor 19 in the internal space 7, the pressure signals of which are supplied to the evaluation unit 18. From the pressure values in the internal space 7, however, the temperature of the liquid gas 6 within the internal space may be calculated, as explained below in greater detail, and therefrom the temperature of the internal wall 3 may be derived. Instead of the temperature sensor 15 at the external wall 1, the temperature of an environment thermometer (e.g., external thermometer of a vehicle) may be assumed as temperature of the external wall 1. Such environment thermometers have become standard in vehicles. There is to be noted, however, that the accuracy of the method according to the invention is reduced. Transmitting the signals of the temperature sensors 13, 14, 15 of the filling level gauge 17 and of the pressure sensor 19 may be realized in a wireless way or wire-bond at the evaluation unit 18. In the case of a wire line, the wires may be realized, e.g., along the rod 10, the attachment rods 9 or the pipe 8, or there may be realized a dedicated cable line within the cryocontainer 30.

The temperature of the heat insulation panels or of the multi-layer insulation, respectively, is dependent on:
- the emission levels of the surfaces: namely, of the internal side of the external wall, the respective panel (external side and internal side) and the external side of the internal wall;
- the number and size of the break-throughs or other openings (interruptions) in the panels;
- the solid body heat conduction via construction-related heat bridges to/from the panels to the neighbouring components such as, e.g., internal wall, external wall, pipelines, etc.
- the solid body heat conduction via (unexpected, e.g., caused by mechanical influences) heat bridges to/from the panels to neighbouring components;
- the residual gas heat conduction, which is dependent on the vacuum pressure.

The evaluation unit 18 of the device 30 according to the invention is configured to calculate, from temperature signals supplied by at least two of the at least three temperature sensors 13, 14, 15 that are spaced apart from another, a temperature course on the basis of heat transfer via heat radiation, which contains the at least two temperatures, and to establish a relation between this temperature course and at least the third temperatures determined, in this way drawing a conclusion on the vacuum pressure within the vacuum chamber 5 or to recognize optionally damage of the external wall 1 and/or the internal wall 3, respectively. Heat radiation is proportional to the fourth power of the temperature ($T^4$), whereas the solid body heat conduction and the residual gas heat conduction are proportional to the first power of the temperature ($T^1$). The temperature courses on the basis of the heat radiation and the temperature courses on the basis of solid body heat conduction and/or residual gas heat conduction, hence, differ respectively markedly. Temperature courses relying on heat radiation have a curved course, whereas temperature courses relying on the solid body heat conduction and the residual gas heat conduction in general follow a straight line.

In the following there is explained by way of the temperatures recurrently measured at the external wall 1, a heat insulation panel 2 and the internal wall 3 of the cryocontainer 30, how the introduction of heat into the internal tank defined by the internal wall 3 is determined according to the invention and how there may be drawn a conclusion on the vacuum pressure in the vacuum chamber 5 or how there may be recognized optionally damage at the external wall 1 and/or the internal wall 3. For a better understanding, there is made reference to the temperature courses depicted in the temperature/path diagrams of the FIGS. 2 to 5, which each show the temperatures measured at the external wall 1, the heat insulation panel 2 and the internal wall 3. There is to be mentioned that the inventive measurement and evaluation principles explained in the following will also be valid if one of the temperatures is measured at a further heat insulation panel rather than at the external wall 1 or at the internal wall 3. It is also possible and even recommended in regard to the accuracy of evaluation to use more than three temperatures for measurement.

Figure 2:
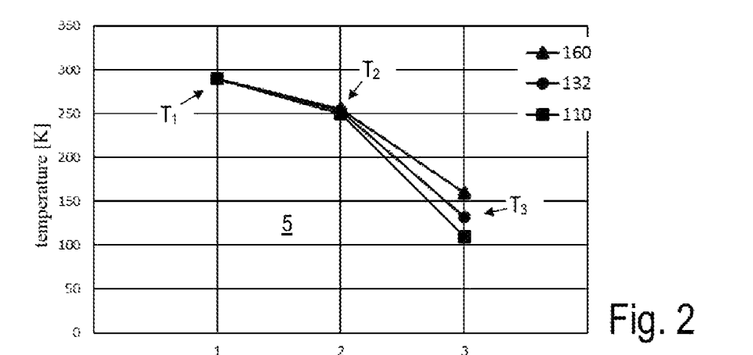
FIG. 2 shows temperature courses at constant external temperature and varying internal tank temperature.
Figure 3:
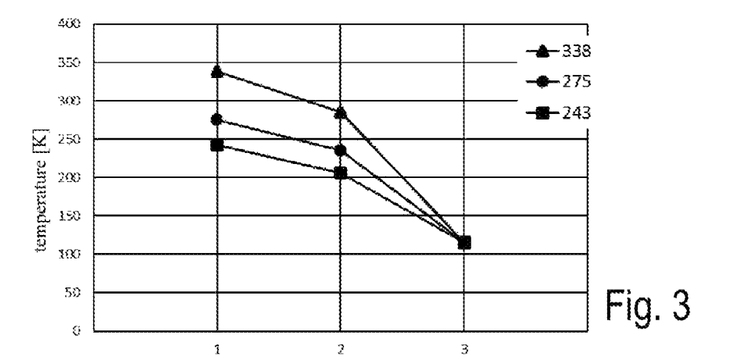
FIG. 3 shows temperature courses at constant internal tank temperature and varying external temperatures.
Figure 4:
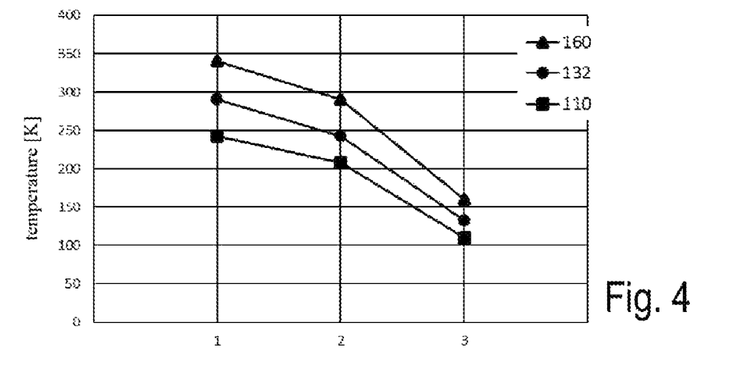
FIG. 4 shows temperature courses at a combination of the highest external temperature with the highest internal tank temperature and vice cersa.
Figure 5:
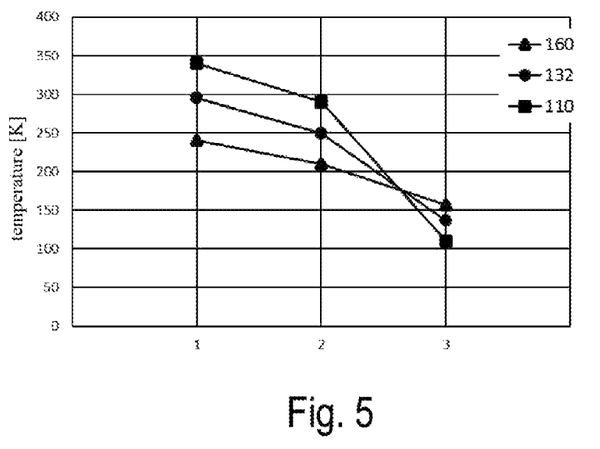
FIG. 5 shows temperature courses at a combination of the highest external temperature with the lowest internal tank temperature and vice versa. The FIGS. 2 to 5 show temperature—path diagrams, which illustrate the influence of the temperatures at the external wall and the internal wall of the cryocontainer on the temperature of a heat insulation panel with intact vacuum.

The FIGS. 2 to 5 show temperature-path diagrams, which illustrate the influence of the temperatures at the external wall and the internal wall of the cryocontainer on the temperature of a heat insulation panel with intact vacuum. The diagrams of the FIGS. 2 to 5 show the influence of the temperatures at the external wall 1 and the internal wall 3 on the temperature of the heat insulation panel 2 at intact vacuum within the vacuum chamber 5. FIG. 2 shows temperature courses at constant external temperature and varying internal tank temperatures. FIG. 3 shows temperature courses at constant internal tank temperature and varying external temperatures. FIG. 4 shows temperature courses at a combination of the highest external temperature with the highest internal tank temperature and vice versa. FIG. 5 shows temperature courses at a combination of the highest external temperature with the lowest internal tank temperature and vice versa.

The external temperature in the automotive application of the dual-wall, vacuum-insulated cryocontainer or cryotank, respectively, is expected to be (interpreted to be) in general between −40° C. (243K) and +65° C. (338K); the high temperature is achieved with direct sun radiation onto the cryocontainer. The internal tank temperature is determined by the storage pressure, as cryogenic liquids are stored as boiling liquids and as the boiling temperature is dependent on the pressure, see table 1 below.

TABLE 1 boiling temperature of methane, dependent on pressure
Liquid methane

| Pressure | Boiling temperature | |
|---|---|---|
| [bar] | [K] | [° C.] |
| 0.0 | 112 | −162 |
| 8.0 | 147 | −126 |
| 16.0 | 162 | −111 |

As the storage pressure in the cryocontainer (cryotank) may strongly vary according to the type of operation—open container, closed container, there is to be expected a corresponding change of the internal tank temperature. In real operation, the actual internal tank temperature may deviate, according to the container size, by several Kelvin from the theoretical boiling temperature as a consequence of deviations from the ideal thermodynamic balance status. In this way, however, the evaluability will not be substantially reduced in its significance.

Figure 6:
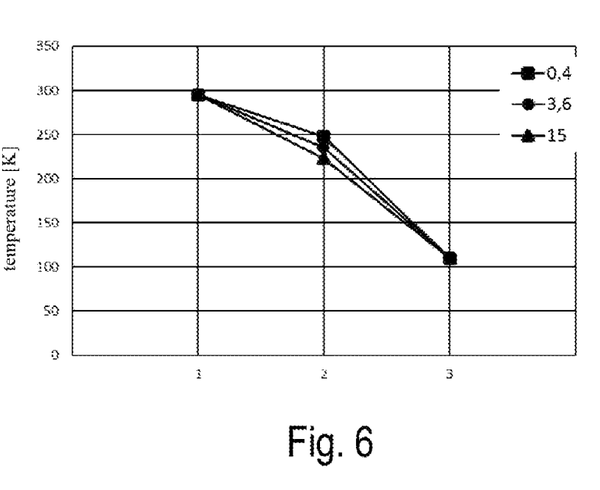
FIG. 6 shows a temperature—path diagram having a constant external temperature at the external wall and a constant internal tank temperature at the internal wall of the cryocontainer, with vacuum pressure degradation within the vacuum chamber.

FIG. 6 shows a temperature—path diagram having a constant external temperature at the external wall 1 and a constant internal tank temperature at the internal wall 3, with vacuum pressure degradation within the vacuum chamber, represented by a factor, which is proportional to the heat transfer by way of residual gas heat conduction (RGL) An RGL factor of 0.4 (measurement points depicted as squares □) represents an intact vacuum within the vacuum chamber 5, wherein the heat transfer by way of residual gas heat conduction is neglectably low. An RGL factor of 3.6 (measurement points depicted as circles ○) represents a reduced vacuum within the vacuum chamber 5, and an RGL factor of 15 (measurement points depicted as triangles ▲) represents a significantly reduced vacuum.

FIG. 6 shows the influence of increasing heat transfer (in addition to the existing heat transfer by radiation) by way of residual gas heat conduction (even if the transfer regime changes, culminating in convection, in the case of increasing proportion). The panel temperature decreases (!) in the case of degraded vacuum of 148 K at an RGL factor of 0.4 to 220 K at an RGL factor of 15. Under constant environment conditions, there may also be found with the panel temperature having good signal quality a change of vacuum pressure. In contrast to what has intuitively been expected and to the opinions of those skilled in the art on the disclosed prior art, the panel temperature will not increase with deterioration vacuum quality but will rather decrease (!), and even markedly. The reason therefore is the different proportionality of the different kinds of heat transfer to the temperature (difference). The panel temperature will set at a temperature, at which the heat flow $Q_{12}$ from the external wall 1 to the panel 2 is equal to the heat flow $Q_{23}$ from the panel 2 to the internal wall 3, requiring continuity. Pure heat radiation follows the difference of the fourth powers of the temperature, whereas residual gas heat conduction or heat conduction, respectively, will follow the difference of the temperature (first power, linear). In the case of markedly dominating heat radiation there follows that the temperature difference between external wall 1 and panel 2 is markedly less than between panel 2 and internal tank 3.

If there is not added a linear component (residual gas heat conduction, heat conduction), the panel temperature at the extreme case will decrease down to the arithmetic mean of the external temperature and the internal tank temperature.

An increase of the panel temperature is only possible if an additional heat flow from the external wall to the panel is given, e.g. if such a physical contact is added by a welt in the external wall. Continuity demands that the additional heat is transferred from the outside to the internal tank, wherein there does not occur any change of the composition of radiation and optionally other heat flows (such as, e.g., any present panel suspensions or the like). For this reason, the temperature difference has to increase, which is why also the panel temperature has to increase (The internal tank temperature, however, is determined by the pressure-dependent boiling point of the gas stored).

Due to the large ranges, within which the temperatures of the external wall and of the internal tank may lie, it is not possible to detect, on the basis of simply the panel temperature, a deterioration of the vacuum or of the insulation quality. An interpretation of the temperatures measured is only made possible with the aid of a calculation or approximation including the responsible rates of heat transfer.

According to the findings described above and the knowledge of the relations there between it is now possible to detect different damage cases or perform additional examinations of plausibility, respectively.

The evaluation of the temperatures measured also provides for a conclusion on vacuum pressure. From measurements at different vacuum pressures there is known the panel temperature as a function of vacuum pressure. At the same time, the panel temperature may be calculated at different vacuum pressures with the aid of the theoretical description of the physical and thermodynamic relations. From a comparison of the measurements and calculations the required parameters may be determined, optionally using even more increased accuracy than this would be possible on the basis of literature values. In this way, under an assumption of a positive evaluation of all examinations of plausibility, on the basis of the panel temperature, there may be drawn a conclusion in regard to the vacuum pressure. The explanations given above are in the following expressed using physical formulae:

External wall 1 ➔ $Q_{12}$ ➔ panel 2 ➔ $Q_{23}$ ➔ internal wall 3

$$Q_{12}=Q_{radiation12}+Q_{heat\ conduction12}+Q_{residual\ gas\ heat\ conduction12}$$

$$Q_{23}=Q_{radiation23}+Q_{heat\ conduction23}+Q_{residual\ gas\ heat\ conduction23}$$

$$Q_{12}=Q_{23}$$

$$Q_{radiation12}=f(T_1^4,T_2^4,\varepsilon_1,\varepsilon_2,A_1,A_2,\sigma)$$

$$Q_{heat\ conduction12} = f(T_1^1, T_2^1, \lambda_{12}, L_{12}, A_{12}) \quad \text{(Fourier Law)}$$

$$Q_{residual\ gas\ heat\ conduction} \text{ proportional to } f(p_{RGL}, T, \dots)$$

(equations above are analogously valid for $Q_{23} = Q_{radiation23} + Q_{heat\ conduction23} + Q_{residual\ gas\ heat\ conduction23}$)

wherein:

Q . . . heat flow ($Q_{12}$ from the external wall to the panel, $Q_{23}$ from panel to internal wall)

T . . . temperature ($T_1$ at the external wall 1, $T_2$ at the panel, $T_3$ at the internal wall)

ε . . . emission level ($\varepsilon_1$ at the external wall 1, $\varepsilon_2$ at the panel 2)

σ . . . Boltzmann constant

A . . . surface area ($A_1$ of the external wall, $A_2$ of the panel 2)

$\lambda_{12}$ . . . heat conductivity of the suspension $L_{12}$ . . . 1/length of the suspension relevant for heat conduction $p_{RGL}$ . . . vacuum pressure This equation system may be solved upon presentation of the temperatures or of the vacuum pressure, respectively. There is to be noted that in the case of vacuum pressures above about $10^{-4}$ mbar and smaller, the portion of the heat transferred by residual gas heat conduction is neglectably low, this is, that the thermal insulation system has reached its desired performance. This also means that the panel temperature $T_2$ at vacuum pressures of equal to or smaller than this threshold value will not change anymore. However, if the vacuum pressure increases such that there develops a heat flow technically relevant by way of residual gas heat conduction, then this may be detected using the decreasing (!) panel temperature. The panel temperature is proportional to the vacuum pressure within the relevant range. For this reason, within this range, there may be drawn a conclusion on the vacuum pressure also via the panel temperature.

The evaluation is similarly possible using several panels or multi-layer insulation (MLI) or a combination of panel and multi-layer insulation, respectively. In this connection, three measured temperatures are in general sufficient, wherein the external container temperature will not be required in any case. It is, e.g., sufficient to measure the temperature of two panels and of the internal tank, as there may be drawn sufficient conclusions on the compliance with reasonable limit values from the composition of the heat flows and the equation of continuity. As long as heat radiation is prevailing as a form of transfer mechanism, as this is the case with a properly functioning vacuum insulation, the temperatures measured will also be found on a characteristic curve (even if there is no continuous temperature course in the vacuum but rather discrete points of structures surround by vacuum and thus being "temperature-free"). Due to this temperature course in the vacuum consisting of discrete temperature points it is an acceptable approximation to add up the characteristic temperature curve from straight sections, which each connect the temperatures of neighbouring discrete straight sections, wherein there may be determined from the angle α whether the prevailing heat transfer is the heat radiation having a temperature course of the fourth power and, hence, the vacuum pressure is sufficiently low, or whether linear heat conduction mechanisms play an undesirably important role, indicating defects of the cryocontainer. From the velocity of the change of the angle α, there is proportionally given the velocity of the change of the temperature at this discrete point, wherefrom there may be drawn a conclusion regarding the cause of change.

The evaluation with the aid of the equation system above, however, may also include fixed heat conduction paths, i.e., for example, the heat conduction flowing via the suspension system of the panels into the panels. In this way, heat conduction or the "finished construction", respectively, may be integrated in the desired status evaluation. At the same time, this gives in turn the possibility to recognize a deviation. For example, if the panel temperature increases, then this may only be caused by an additional (unexpected) heat flow from the external wall to the panel. An increase of the vacuum pressure, however, would simultaneously have an influence on the heat flows of both sides (internal side and external side).

In this way, this device is also suitable in order to detect, optionally in combination with the plausibility checks mentioned further below, with the aid of further parameters, critical mechanical damage of the cryotank or mechanical structures of the insulation system.

Instead of measuring the internal tank temperature, there may be measured and evaluated the internal tank pressure: As described, the boiling temperature of gases (substances) stored therein will change in dependence on the storage pressure within the internal tank. With cryotanks there will develop, one the side, dependent on the size of the tanks (from several litres to thousands of cubic metres in general), deviations from the thermodynamic balance status, i.e. it may be that the liquid phase is "supercooled", i.e. the temperature determined on the basis of the pressure measured is several Kelvin above the actual temperature.

In the tank filling process, there is generated pressure by a pump, which is why in this transient state pressure and temperature are decoupled from one another. Such a process may be recognized and correctly interpreted by way of, for example, integration of the filling level signals in the evaluation of the wall temperatures and panel temperatures.

During retrieving (optionally also filling), the panel temperature may markedly deviate from the temperature expected for the idle status—by inadvertent or constructively configured contact between pipelines and insulation/panels. By recognizing the respective status, the wall temperatures and the panel temperatures may be further correctly interpreted.

By the rate of the change of the temperatures measured, cases of damage may be distinguished from intact functionability. Interruption of the vacuum, for example, will lead to a very rapid temperature change compared to the change of temperature in the case of a slow pressure increase within the container as a consequence of, for example, a parked vehicle under changing environment/weather conditions. Comparison of the rates of change of the respective conditions, hence, also serves for correctly interpreting the wall temperatures and the panel temperature.

Figure 7:
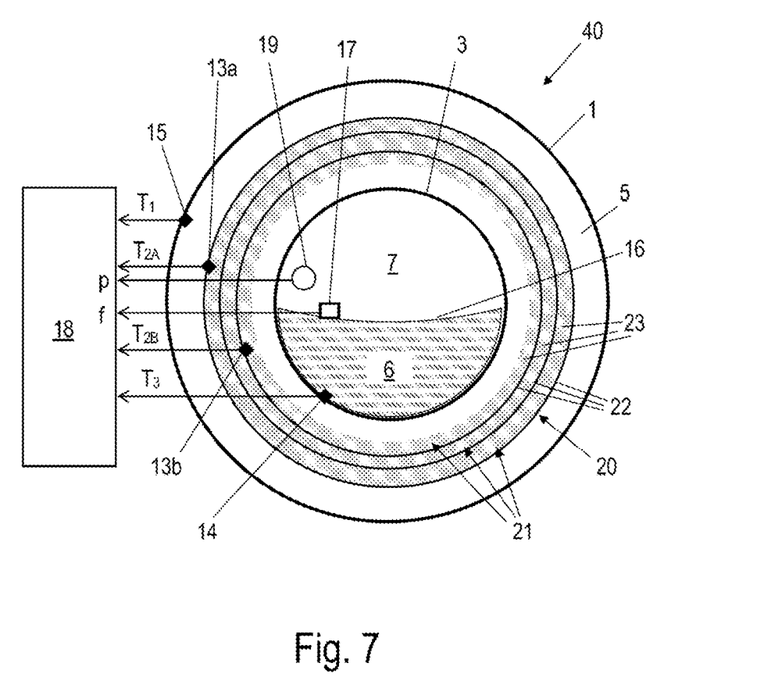
FIG. 7 schematically shows a further embodiment of a cryocontainer having an inventive device for determining the heat insulation quality of this dual-wall, vacuum-insulated container in a cross-section.

FIG. 7 schematically shows a second embodiment of a cryocontainer 40 according to the invention in a cross-sectional view. Similar to the embodiment illustrated in FIG. 2, also the embodiment of the cryocontainer 40 is construed as a dual-wall container having an external wall 1, which defines an external container, and an internal tank defined by an internal wall 3 and arranged within the external container. The interspace between the external wall and the internal wall forms a vacuum chamber 5, which is evacuated before starting the operation of the cryocontainer 40. The internal tank is configured to receive liquefied gas 6. The filling level 16 of the liquefied gas 6 may be measured using a filling level gauge 17, the signal of which is supplied to the evaluation unit 18. The suspension of the internal tank at the external container is omitted due to reasons of clarity, rather corresponding to that of the first embodiment. The internal wall 3 is surrounded by a heat insulation device in the form of a multi-layer insulation (MLI) 20, which comprises several composite layers 21 made from a metal film 22, e.g., aluminium film, and a heat insulation material 23, e.g., fibre material or foamed material. The composite layers 21 are arranged concentrically around the internal wall 3. Alternatively, the composite layers 21 may be configured as coils having several convolutions. The suspension of the multi-layer insulation 20 may be configured like the suspension of the panels of the first embodiment.

In this embodiment, there are arranged at several composite layers 21 temperature sensors 13a, 13b (number of the temperature sensors is not limited to two), which recurrently measure the temperatures $T_{2A}$, $T_{2B}$ of points of the multi-layer insulation 20 that are spaced apart from one another. Two further temperature sensors 15, 14 measure recurrently the temperature $T_1$ of the external wall 1 (by means of the temperature sensor 15) and/or the temperature $T_3$ at the internal wall 3 (by means of the temperature sensor 14). The temperature signals of the temperature sensors 13a, 13b, 14, 15 are supplied to the evaluation unit 18, which also receives the filling level signals f of the filling level gauge 17. Additionally or alternatively to the temperature sensor 14 at the internal wall 3, there may also be provided within the internal space 7 a pressure sensor 19, the pressure signals of which are supplied to the evaluation unit 18. Instead of the temperature sensor 15 at the external wall 1, the temperature of an environment thermometer (e.g., external thermometer in vehicle) may approximatingly be assumed as the temperature of the external wall 1. The evaluation of the temperature signals, pressure signals and signals of the filling level gauge are realized as described above.

The invention claimed is:

1. A device for determining a heat insulation quality of a dual-wall, vacuum-insulated container, wherein the container has an external wall facing the surrounding and an internal wall defining an internal tank, wherein there is formed between the external wall and internal wall of the dual-wall container a vacuum chamber, in which there is arranged at least one heat insulation device, wherein the container includes at last three temperature sensors spaced apart from another, which recurrently register the instantaneous temperatures of the container, wherein positions of the temperature sensors are selected from positions at the external wall, the internal wall and/or at the heat insulation device, wherein the device comprises:
an evaluation unit, which receives the instantaneous temperatures registered by the temperature sensors, wherein in the evaluation unit there is stored a layer-wise heat transfer model on a basis of a construction and material characteristics of the container and heat radiation resulting therefrom, and wherein the evaluation unit is configured to calculate from the layer-wise heat transfer model at least in some points a temperature course, which contains at least two of the temperatures registered by the temperature sensors, and to calculate from the temperature course a desired temperature value for the position of at least one further of the temperature sensors and to compare the desired temperature with the actual temperature value actually registered by this temperature sensor and to detect from the deviation between the desired temperature value and the actual temperature value a change of the heat insulation quality of the container if the deviation exceeds a limit value.

2. A device according to claim 1, wherein the heat transfer model of the container will also take into account the heat conduction resulting from the construction and material characteristics.

3. A device according to claim 1, wherein the heat insulation device comprises at least one heat insulation panel and/or a multi-layer insulation having composite layers made from a metal film 22 and a heat insulating material, wherein the composite layers are optionally formed as coil having several convolutions.

4. A device according to claim 1, wherein the evaluation unit classifies the detected change of the heat insulation quality of the container as a pressure increase within the vacuum chamber if the deviation of the actual temperature value from the desired temperature value is about the limit value or rather less than the desired temperature value.

5. A device according to claim 1, wherein the evaluation unit classifies the detected change of the heat insulation quality of the container as a damage to the external wall if the deviation of the actual temperature value from the desired temperature value is about the limit value or rather more than the desired temperature value.

6. A device according to claim 1, wherein the evaluation unit is configured to determine the temperature of the external wall from environment conditions, for which reason the evaluation unit is connected preferably with a temperature sensor of an external device, in particular the external temperature sensor of a vehicle, at which the device is attached, and derives the temperature of the external wall from the temperature signals thereof.

7. A device according to claim 1, wherein the evaluation unit is configured to determine from the difference between the desired temperature value and the actual temperature value the vacuum pressure within the vacuum chamber, on the basis of preceding temperature measurements at different known vacuum pressures within the vacuum chamber.

8. A device according to claim 1, wherein additionally or alternatively to the temperature sensor at the internal wall, there is provided a pressure sensor in the internal tank, and the evaluation unit is configured to receive the pressure signals of the pressure sensor and to determine from the pressure signals the temperature within the internal tank by way of the pressure dependency of the boiling temperature, at which liquid gas is stored within the internal tank.

9. A device according to claim 8, wherein the evaluation unit is configured to classify the change of the pressure within the internal tank measured by the pressure sensor as a transient tank filling process if the rate of change exceeds a limit value.

10. A device according to claim 1, wherein there is arranged within the internal tank a filling level sensor (17), the filling level signals (f) of which are supplied to the evaluation unit, wherein the evaluation unit is configured to classify the change of the filling level (16) of the stored liquid gas (7) as a transient tank filling process if the rate of change exceeds a limit value.

11. A device according to claim 1, wherein the evaluation unit is configured to approximate the temperature course by arranging straight sections flush to one another, which straight sections respectively connect neighbouring actual temperature values registered by the temperature sensors, wherein the evaluation unit derives from an angle ($\alpha$) at a connection point between two adjacent straight sections the derivation of the actual temperature value at this connection point from the desired temperature value.

12. A device according to claim 11, wherein the evaluation unit is configured to classify from a rate of change of the angle α, which is proportional to the rate of change of the actual temperature value at this connection point, the reason therefore.

13. A method for determining a heat insulation quality of a dual-wall, vacuum-insulated container, wherein the container has an external wall facing a surrounding and an internal wall defining an internal tank, wherein there is formed between the external wall and the internal wall of the dual-wall container a vacuum chamber, in which there is arranged at least one heat insulation device, wherein the container has at last three temperature sensors spaced apart from another, which recurrently register instantaneous temperatures of the container, wherein the positions of the temperature sensors are selected from positions at the external wall, the internal wall and/or the heat insulation device, the method comprising:
- calculating at least in some points a temperature course using a layer-wise heat transfer model on the basis of a construction and material characteristics of the container and heat radiation resulting therefrom, which temperature course contains at least two of the temperatures registered by the temperature sensors; and
- calculating from the temperature course a desired temperature value for the position of at least one further of the temperature sensors;
- comparing the desired temperature value with the actual temperature value actually registered by this temperature sensor; and
- detecting from a deviation between the desired temperature value and the actual temperature value a change of the heat insulation quality of the container if the deviation exceeds a limit value.

14. A method according to claim 13, wherein the heat transfer model of the container also takes into account the heat conduction resulting from the construction and material characteristics of the container.

15. A method according to claim 13, wherein the detected change of the heat insulation quality of the container is classified as a pressure increase within the vacuum chamber if the deviation of the actual temperature value from the desired temperature value is about the limit value or rather less than the desired temperature value.

16. A method according to claim 13, wherein the detected change of the heat insulation quality of the container is classified as a damage of the external wall if the deviation of the actual temperature value from the desired temperature value is about the limit value or rather more than the desired temperature value.

17. A method according to claim 13, wherein the vacuum pressure within the vacuum chamber is determined from the difference between the desired temperature value and the actual temperature value, on the basis of preceding temperature measurements at different known vacuum pressures within the vacuum chamber.

18. A method according to claim 13, wherein additionally or alternatively to the temperature sensor at the internal wall there is provided a pressure sensor in the internal tank and that the temperature in the internal tank is determined from the pressure signals by way of the pressure dependency of the boiling temperature, at which liquid gas is stored within the internal tank.

19. A method according to claim 18, wherein the change of the pressure within the internal tank that is measured by the pressure sensor is classified as a transient tank filling process if the rate of change exceeds a limit value.

20. A method according to claim 13, wherein there is arranged within the internal tank a filling level sensor (17), wherein the change of the filling level (16) of the stored liquid gas (7) is classified as a transient tank filling process if the rate of change exceeds a limit value.

21. A method according to claim 13, wherein the temperature course is approximated by arranging straight sections flush to one another, which straight sections respectively connect neighbouring actual temperature values registered by the temperature sensors, wherein there is derived from an angle (α) at a connection point between two adjacent straight sections the derivation of the actual temperature value at this connection point from the desired temperature value.

22. A method according to claim 21, wherein from a rate of change of the angle α, which is proportional to the rate of change of the actual temperature value at this connection point, there is classified the reason thereof.

* * * * *